W. SCHUTTE.
SLED.
APPLICATION FILED MAY 21, 1920.
1,359,436.    Patented Nov. 16, 1920.
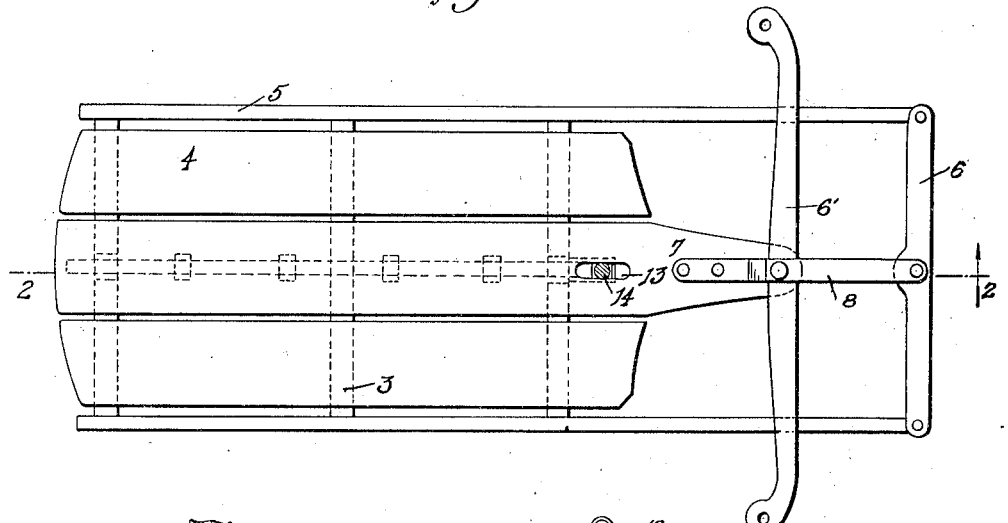
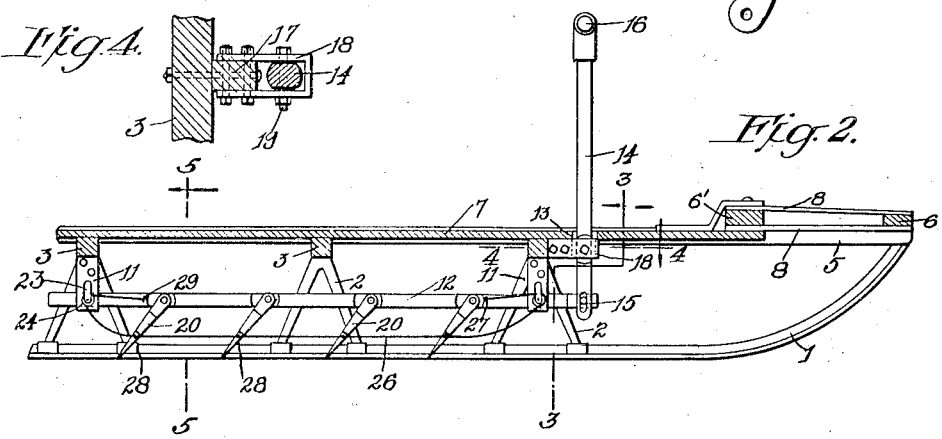
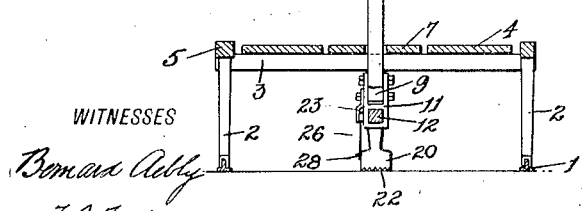
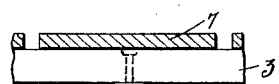
WITNESSES
Bernard Abby
F. J. Foster
INVENTOR
WALTER SCHUTTE
BY
ATTORNEYS

UNITED STATES PATENT OFFICE.

WALTER SCHUTTE, OF HADDAM, CONNECTICUT.

SLED.

1,359,436.　　　　Specification of Letters Patent.　　Patented Nov. 16, 1920.

Application filed May 21, 1920. Serial No. 383,191.

*To all whom it may concern:*

Be it known that I, WALTER SCHUTTE, a citizen of the United States, and a resident of Haddam, in the county of Middlesex and State of Connecticut, have invented a new and Improved Sled, of which the following is a full, clear, and exact description.

This invention relates to improvements in sleds, an object of the invention being to provide a sled of the self-propelling type which may be propelled and steered by the operator at the same time.

A further object is to provide a sled of this type with a hand-operated propelling means and a foot-operated steering means.

A still further object is to provide a self-propelled sled which is of simple and durable construction and which will most efficiently accommodate itself to the uses for which it is intended.

With these and other objects in view, the invention consists in certain novel features of construction and combinations and arrangements of parts which will be more fully hereinafter described and pointed out in the claims.

In the accompanying drawings—

Figure 1 is a top plan view of the device with the lever in section;

Fig. 2 is a view in section on the line 2—2 of Fig. 1;

Fig. 3 is a view in section on the line 3—3 of Fig. 2;

Fig. 4 is a fragmentary view in section on the line 4—4 of Fig. 2; and

Fig. 5 is a fragmentary view in section on the line 5—5 of Fig. 2.

In this invention I employ the usual type of flexible frame, which comprises a pair of runners 1 curved upwardly at their forward ends, uprights 2 secured to the runners, and crossbars 3 connecting the uprights and supporting a seat 4. Side bars 5 connect the ends of the crossbars 3 and extend forwardly from the seat portion 4 to meet the curved forward ends of the runners 1. A transverse metal crosspiece or lever 6 connects the forward ends of the side bars 5 at their point of juncture with the ends of the runners 1.

The center board 7 of the seat 4 projects forwardly beyond the other boards of the seat and tapers at its forward end. The forward end of the center board 7 is connected to the intermediate portion of the lever 6 by two flexible links 8, 8, and a steering bar 6' is pivotally secured on the forward end of the center board between the links 8.

I have described briefly the flexible framework and steering means in use with the sled now on the market, and it is preferably to a sled of this type that my improved propelling device is attached.

In order to attach the propelling means, I provide a pair of depending blocks 9 9 at the center of two of the crossbars 3. These blocks may be secured to the crossbars by means of bolts 10 or in any other approved manner. Hanging guide brackets 11 are suspended from the blocks 9 and support a reciprocating spur-carrying bar 12 which is adapted to slide in the brackets.

The center board 7 of the sled is formed adjacent its forward end with a slot 13. A lever 14, which has a slot and pin connection 15 with the forward end of the bar 12, projects upwardly through the slot 13 and is provided with a handle 16 located at the upper end of the lever to facilitate its operation.

A block 17 is bolted to the forward side of the forward crossbar 3 and a U bracket 18 is secured to the block 17. The lever 14 is fulcrumed on a bolt 19 in the bracket 18, it being understood that the bracket 18 registers with the slot 13.

Spurs 20, bifurcated at their upper ends to straddle the bar 12, are pivotally suspended from the said bar on bolts 21 projected through the bar. The lower ends of the spurs 20 are transversely extended and formed with teeth 22 adapted to engage the snow or ice over which the sled is passing.

Angle brackets 23 are provided on the sides of the guide brackets 11, and grooved pulleys 24 are mounted on studs 25 connecting the brackets 23 and 11.

A flexible coupling member 26 has one end secured, as at 27, to the bar 12 in advance of the series of spurs 20. The member 26 is then passed around the forward pulley 24 and is connected in turn to all of the spurs 20, as shown at 28, and then passed around rear pulley 24 and secured to the bar 12 as shown at 29, in the rear of the series of spurs 20.

The operation is as follows: The operator seats himself upon the sled with his feet engaging the steering bar 6' and his hands grasping the handle 16. As the upper end of the lever 14 is moved forwardly, the bar 12 will slide rearwardly within the brackets 11. It will be readily seen that as the bar 12 moves rearwardly the cord or other flexible connecting means 26 will operate to pull the lower ends of the spurs 20 forward, digging the teeth 22 into the snow. A rearward movement of the lever 14 in like manner operates through the medium of the flexible device 26 to move the lower ends of the spurs rearward and propel the sled. Hence, a reciprocating motion of the bar 12 within the brackets 11 will impart an oscillatory motion to the spurs 20 through the medium of the flexible member 26.

It is to be understood that if the lever 14 is moved rearwardly a sufficient distance the spurs will be entirely elevated off of the ground, so that the sled may be used for coasting equally as well as for a self-propelling device on a level surface.

Various slight changes and alterations might be made in the general form of the parts described without departing from my invention, and, hence, I do not limit myself to the precise details set forth but consider myself at liberty to make such slight changes and alterations as fairly fall within the spirit and scope of the appended claims.

I claim:

1. In a sled, a reciprocating bar, spurs pivotally connected to and depending from the bar, a flexible device connected at its ends to the bar and at its intermediate portion to the spurs, and adapted to oscillate the spurs to propel the sled when the bar is reciprocated.

2. The combination with a vehicle body of a reciprocating bar, spurs pivotally connected to and movable with the bar, means applying an oscillatory movement of the spurs when said bar is reciprocated, said means comprising a flexible device connected at its ends to the bar and at its intermediate portion to the spurs, and fixed guide pulleys around which said flexible device is passed.

3. A sled comprising a flexible frame, a seat on said frame having an opening therein, a U bracket secured under the seat and registering with the opening, a lever projecting through said opening and fulcrumed adjacent its lower end in said bracket, a handle on said lever, depending guide brackets secured to said frame, a reciprocating bar slidable in said guide brackets and having slot and pin connection with said lever, spurs carried by said bar, and means whereby said spurs may be oscillated to propel the sled.

4. A sled comprising a flexible frame, a pair of guide brackets suspended from said frame, a reciprocating bar slidable longitudinally in said brackets, angle brackets secured to said guide brackets, grooved pulleys mounted between said angle brackets and guide brackets, toothed spurs carried by said bar, a flexible coupling means having its ends secured to said bar being located around said pulleys and secured at its intermediate portion to all of said spurs, a lever fulcrumed adjacent one end and pivotally secured to said bar, and said coupling member adapted when the lever is moved to operate said spurs to propel the sled.

WALTER SCHUTTE.